(12) United States Patent
Asada (10) Patent No.: US 7,652,217 B2
(45) Date of Patent: Jan. 26, 2010

(54) ROTARY TYPE PULSE SWITCH

(75) Inventor: Makoto Asada, Yao (JP)

(73) Assignee: Hosiden Corporation, Osaka (JP)

( * ) Notice: Subject to any disclaimer, the term of this patent is extended or adjusted under 35 U.S.C. 154(b) by 146 days.

(21) Appl. No.: 11/906,999

(22) Filed: Oct. 4, 2007

(65) Prior Publication Data

US 2008/0087529 A1    Apr. 17, 2008

(30) Foreign Application Priority Data

Oct. 11, 2006    (JP) .............................. 2006-277748

(51) Int. Cl.
*H01H 19/00*   (2006.01)

(52) U.S. Cl. .............. 200/19.18; 200/11 R; 200/11 TC; 200/564

(58) Field of Classification Search .............. 200/19.18, 200/11 R, 11 TC, 11 DA, 564, 336
See application file for complete search history.

(56) References Cited

U.S. PATENT DOCUMENTS 3,546,403 A    12/1970    Taesler

2004/0226807 A1    11/2004    Ashton

FOREIGN PATENT DOCUMENTS

| FR | 1557255 | 2/1969 |
|---|---|---|
| JP | 07-147116 | 6/1995 |
| JP | 3038286 | 2/2000 |
| JP | 2002-015643 | 1/2002 |
| JP | 2005044750 | 2/2005 |
| JP | 2006-012701 | 1/2006 |
| JP | 2006210283 | 8/2006 |

*Primary Examiner*—Kyung Lee
(74) *Attorney, Agent, or Firm*—The Webb Law Firm (57) ABSTRACT

A rotary type pulse switch includes a movable electrode 57 having a plurality of contacting portions 57A formed in positions of the same radius from its rotation center, and a fixed electrode 50 disposed face to face with the movable electrode 57 and having a plurality of contacted portions 60 arranged in form of stepping stones on the same circumference as a rotation locus T of the contacting portions 57A. The fixed electrode 50 includes a first fixed electrode pattern 52A, a second fixed electrode pattern 52B and a common fixed electrode pattern 51, each of the fixed electrode patterns 51, 52A, 52B being in a mutually nonconductive state. The contacted portions 60 are arranged in such a positional relationship that a full insulation state occurs during rotation of the movable electrode 57 in which none of the contacting portions 57A contact the first fixed electrode pattern 52A, second fixed electrode pattern 52B or common fixed electrode pattern 51.

2 Claims, 9 Drawing Sheets

ROTARY TYPE PULSE SWITCH

BACKGROUND OF THE INVENTION

1. Field of the Invention

This invention relates to a rotary type pulse switch, and more particularly to a rotary type pulse switch comprising a movable electrode with a rotation center and having a plurality of contacting portions formed in positions of the same radius from the rotation center, and a fixed electrode disposed face to face with the movable electrode and having a plurality of contacted portions arranged in form of stepping stones on the same circumference as a rotation locus of the contacting portions of the movable electrode, wherein rotation information of the movable electrode is detected based on conduction states of the contacting portions and the contacted portions when the movable electrode is rotated.

2. Description of the Related Art

Control input units of mobile telephones, PDAs and game machines, and control input units of home electric appliances, have rotary type pulse switches for detecting the rotating operations thereof. The rotary type pulse switch described in Japanese patent No. 3038286 has a movable electrode with a plurality of contacting portions formed in positions of the same radius from the rotation center, and a fixed electrode disposed face to face with the movable electrode and having a plurality of contacted portions arranged in form of stepping stones on the same circumference as a rotation locus of the contacting portions of the movable electrode. Rotation information such as an amount of rotation, direction of rotation and the like of the movable electrode is detected based on conduction states of the contacting portions and contacted portions when the movable electrode is rotated. The fixed electrode includes a first fixed electrode pattern having one or more of the contacted portions, a second fixed electrode pattern having one or more of the contacted portions, and a common fixed electrode pattern having one contacted portion. Each fixed electrode pattern is arranged in a non-conducting state with respect to the others. While the movable electrode makes one rotation (360° rotation), at least one contacting portion of the movable electrode constantly contacts the common fixed electrode pattern consists of one contacted portion. It is therefore possible to derive the rotation information of the movable electrode from an analysis of timing of switching between a contact state and an insulating state of the movable electrode and first fixed electrode pattern, and timing of switching between a contact state and an insulating state of the movable electrode and second fixed electrode pattern.

With the rotary type pulse switch described in Japanese patent No. 3038286, as noted above, while the movable electrode makes one rotation (360° rotation), the movable electrode constantly contacts the common fixed electrode pattern consisting of one contacted portion. Thus, there is a problem that the movable electrode constantly picks up static electricity during the rotation. When the movable electrode is charged with static electricity, the static electricity will enter varied electrical components electrically connected to the movable electrode and fixed electrode. The electrical components can be damaged by electrostatic discharge.

This invention has been made having regard to the problem noted above, and its object is to provide a rotary type pulse switch constructed such that a movable electrode cannot easily pick up static electricity, while securing a required conduction between the movable electrode and fixed electrode.

SUMMARY OF THE INVENTION

In order to fulfill the above object, this invention provides a rotary type pulse switch comprising:

a movable electrode with a rotation center and having a plurality of contacting portions formed in positions of the same radius from the rotation center; and a fixed electrode disposed face to face with the movable electrode and having a plurality of contacted portions arranged in form of stepping stones on the same circumference as a rotation locus of the contacting portions;

wherein the fixed electrode includes a first fixed electrode pattern having at least one of the contacted portions, a second fixed electrode pattern having at least one of the contacted portions, and a common fixed electrode pattern having at least two of the contacted portions, each of the fixed electrode patterns being in a mutually nonconductive state; and the contacted portions are arranged in such a positional relationship that a full insulation state occurs during rotation of the movable electrode in which none of the contacting portions contact the first fixed electrode pattern, the second fixed electrode pattern or the common fixed electrode pattern;

rotation information of the movable electrode being detected based on conduction states of the contacting portions and the contacted portions when the movable electrode is rotated.

According to the above characteristic construction, the contacting portions of the movable electrode and the contacted portions of the fixed electrode are arranged in such a positional relationship that a conduction state in which the movable electrode and fixed electrode are electrically connected and a full insulation state in which the movable electrode and fixed electrode are not electrically connected, occur during rotation of the movable electrode, That is, the movable electrode never picks up static electricity in the full insulation state.

Thus, the rotary type pulse switch provided by this invention is constructed such that, while securing required conduction between the movable electrode and fixed electrode, the movable electrode cannot easily pick up static electricity. This reduces the possibility of varied electrical components electrically connected to the movable electrode and fixed electrode being damaged by electrostatic discharge.

Another characteristic construction of the rotary type pulse switch according to this invention provides grounding means for grounding the movable electrode in times of the full insulation state.

According to this characteristic construction, static electricity on the movable electrode can be released to the grounding means in times of the full insulation state. This further reduces the possibility of the varied electrical components electrically connected to the movable electrode and fixed electrode being damaged by electrostatic discharge.

In a further characteristic construction of the rotary type pulse switch according to this invention, the first fixed electrode pattern has at least two of the contacted portions, the at least two contacted portions being arranged continually on the circumference;

the second fixed electrode pattern has at least two of the contacted portions, the at least two contacted portions being arranged continually on the circumference; and the at least two contacted portions of the common fixed electrode pattern are arranged on the circumference as separated by the at least two contacted portions of the first fixed electrode pattern and the at least two contacted portions of the second fixed electrode pattern.

According to this characteristic construction, the two or more contacted portions of the common fixed electrode pattern are arranged on the same circumference as the rotation locus as separated by the first fixed electrode pattern and second fixed electrode pattern. That is, the two or more contacted portions of the common fixed electrode pattern are arranged on the above circumference as opposed across the first fixed electrode pattern and second fixed electrode pattern. Since the common fixed electrode pattern is separated on the circumference, even when it is necessary to form in the middle part of the circumference other electrode patterns connected to the common fixed electrode pattern, the above other electrode patterns can be formed as connected to the separated parts of the common fixed electrode pattern. Therefore, the above common fixed electrode pattern and other electrode patterns are formed after being positionally adjusted by using each part of the common fixed electrode pattern. The electrode patterns are positioned with high accuracy.

DETAILED DESCRIPTION OF THE PREFERRED EMBODIMENT

First Embodiment

Figure 1:
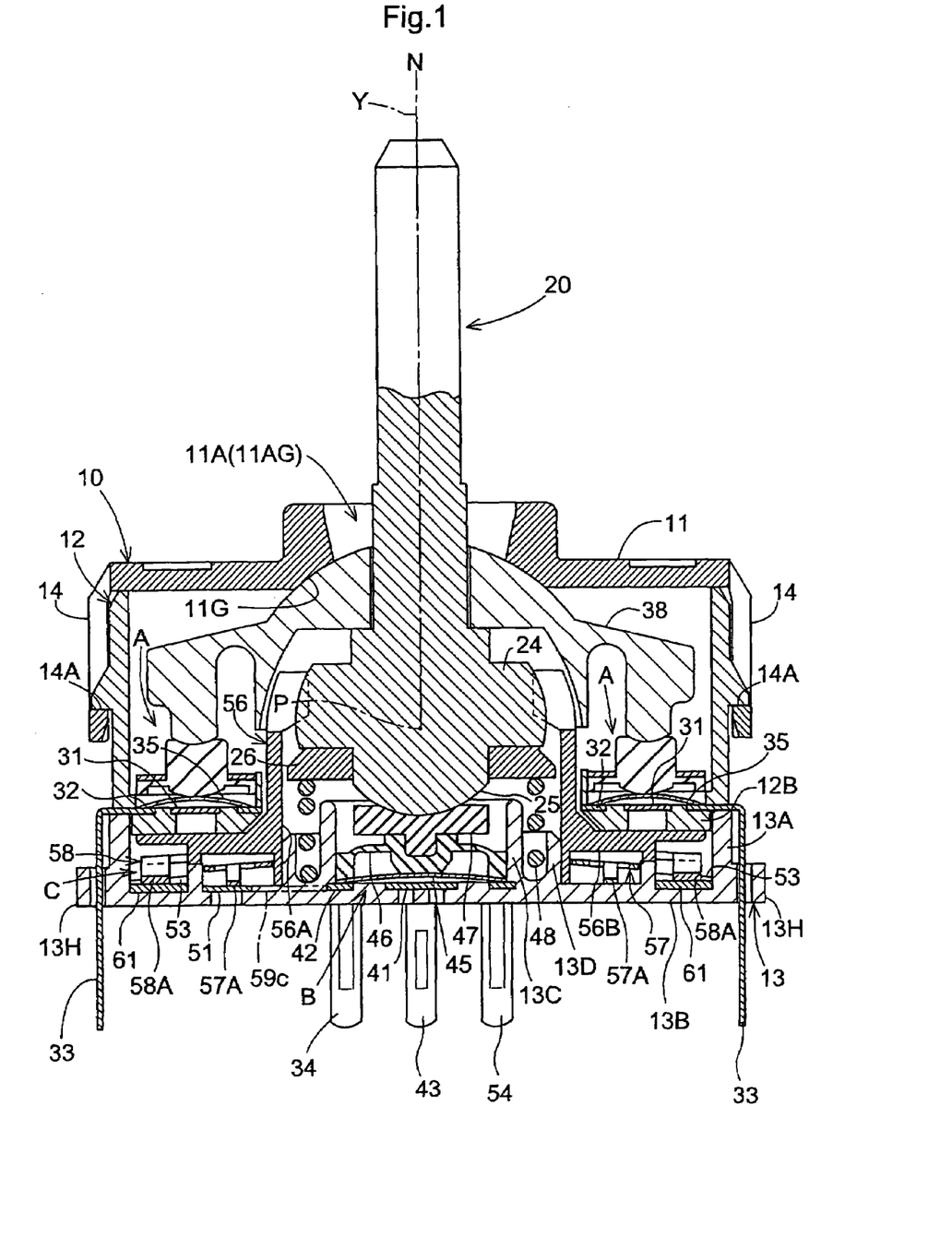
FIG. 1 is a side view in vertical section of a rotary type pulse switch of a first embodiment.
Figure 2:
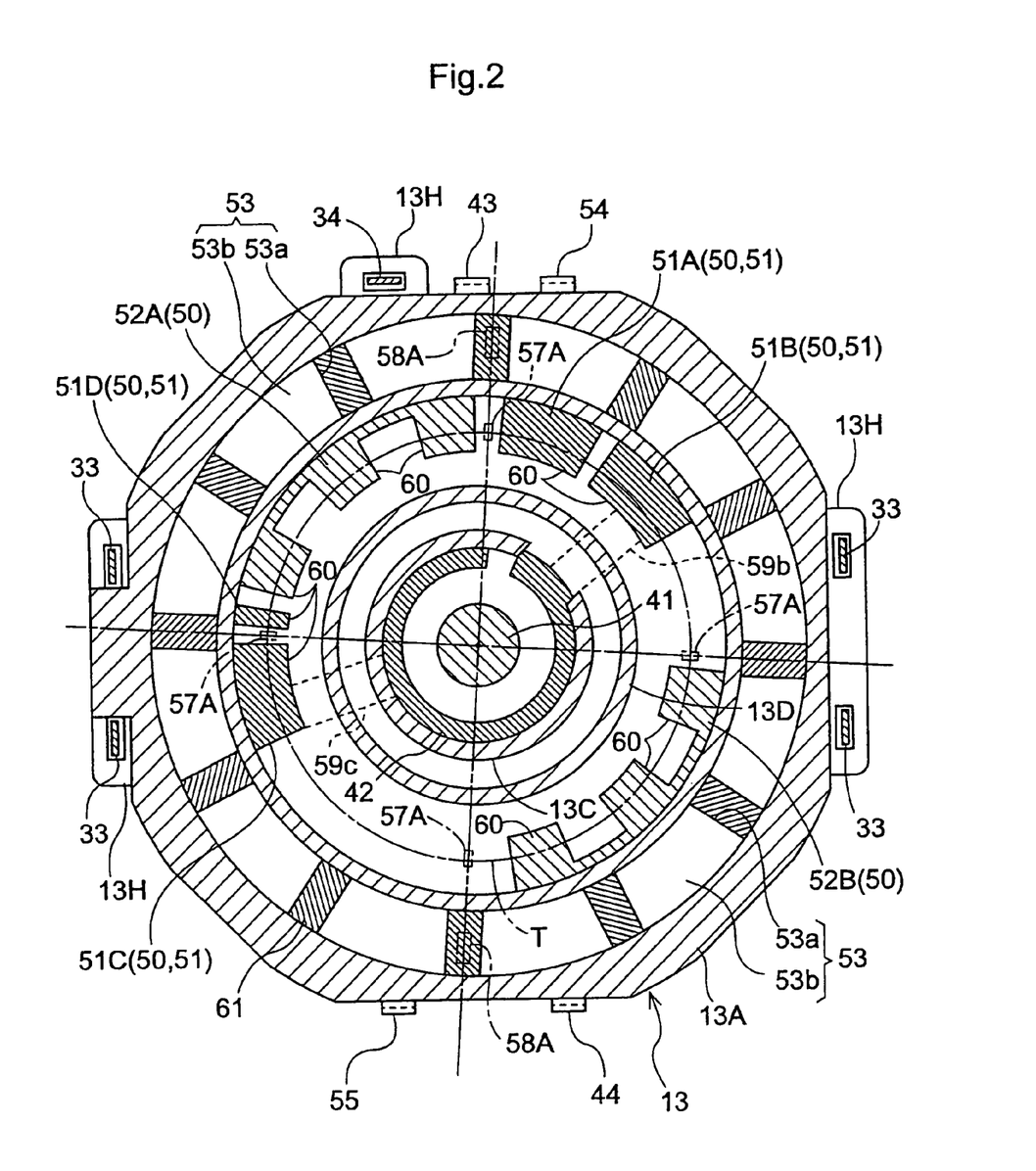
FIG. 2 is a view showing an arrangement of a fixed electrode on a bottom wall of a lower casing.
Figure 3:
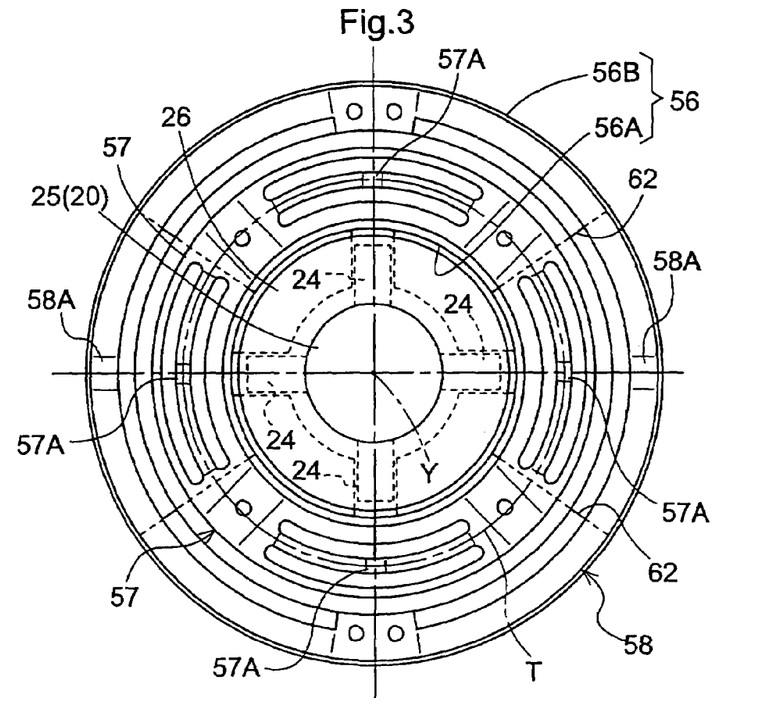
FIG. 3 is a view showing a movable electrode on a rotor.
Figure 4:
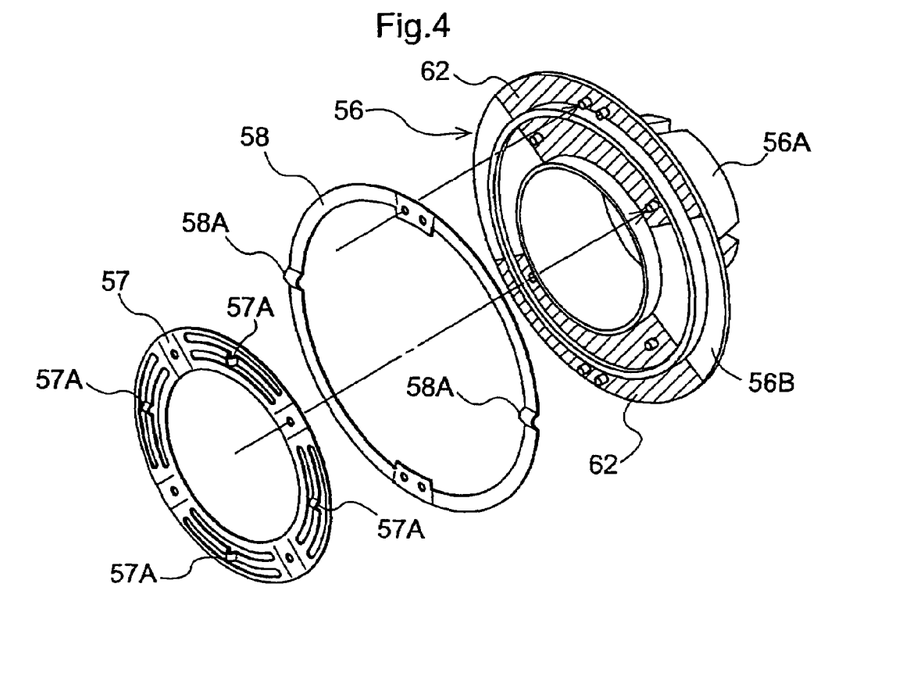
FIG. 4 is an exploded perspective view of the rotor and movable electrode.

A rotary type pulse switch in a first embodiment will be described hereinafter with reference to the drawings. FIG. 1 is a side view in vertical section of the rotary type pulse switch. FIG. 2 is a view showing an arrangement of a fixed electrode on a bottom wall of a lower casing. FIG. 3 is a view showing a movable electrode on a rotor. FIG. 4 is an exploded perspective view of the rotor and movable electrode.

This rotary type pulse switch is included in combined control switches having an operating rod 20 extending vertically with respect to a case 10, a tilt detecting device A for electrically detecting tilting of the operating rod 20, a depression detecting device B for electrically detecting depression along an axis Y of the operating rod 20, and a rotation detecting device C for electrically detecting rotation of the operating rod 20. This combined control switch is provided for a control input unit of a mobile telephone, PDA, or game machine, or a control input unit of a home electric appliance.

Although the vertical direction is irrelevant to the combined control switch in use, the following description will be made where the terms upper or upward and lower or downward are used with reference to FIG. 1.

When the combined control switch is in an inoperative state, the operating rod 20 is maintained in neutral N. The tilt detecting device A detects crisscross tilting of the operating rod 20 from the neutral N. The axis of the operating rod 20 is called rod axis Y herein. The depression detecting device B electrically detects a depression along the rod axis Y. The rotation detecting device C electrically detects an amount of rotation about the rod axis Y of the operating rod 20 in neutral N.

With this combined control switch, the tilt detecting device A is constructed to detect tilting in four directions when the operating rod 20 is operated crisscross. Instead, the tilt detecting device A may be constructed to detect tilting in less than four directions, or five or more directions, e.g. eight directions.

The case 10 includes a top cover 11, an upper casing 12 and a lower casing 13 connected to one another. The top cover 11, upper casing 12 and lower casing 13 are formed by shaping an insulating resin material with dies. The case 10 has a sectional shape of right octagon as seen in a direction along the rod axis Y in neutral N.

The top cover 11 has a perforation 11A vertically penetrated by the operating rod 20. The top cover 11 has a concave guide surface 11G formed in a lower position thereof to be at an equal distance from a tilt center P of the operating rod 20. Further, the top cover 11 has four connecting pieces 14 formed integral with outer peripheral parts thereof to project downward. The connecting pieces 14 have bore-like engaging and connecting portions 14A formed at distal ends thereof.

The perforation 11A has guide grooves 11AG which, in plan view, coincide with the tilting directions. The guide grooves 11AG define sloped inner surfaces extending toward the tilt center P.

The upper casing 12 has center electrodes 31 formed of a conductor and disposed on an upper surface of an intermediate wall 12B, in four detecting positions in crisscross directions across the operating rod 20. Ring electrodes 32 formed of a conductor is arranged to surround the center electrodes 31. Dome-like spring plates 35 are arranged to cover the ring electrodes 32. When a pressing force acts on the spring plates 35 from above, central parts of spring plates 35 contact the center electrodes 31 by elastic deformation, whereby the center electrodes 31 and ring electrodes 32 become a conduction state.

Formed inside the intermediate wall 12B of the upper casing 12 by insertion technique, are independent tilt detecting circuits for individually connecting to the four center electrodes 31, and a common circuit for connecting to the four ring electrodes 32. The tilt detecting circuits are connected to four tilt detecting leads 33 projecting downward. The common circuit is connected to a single common lead 34 also projecting downward.

The lower casing 13 has, formed as integral parts thereof, a cylindrical side wall 13A parallel to the rod axis Y in neutral N, and a bottom wall 13B perpendicular to the rod axis Y in neutral N. The bottom wall 13B includes, formed centrally of the upper surface thereof to project concentrically, a contact portion 13C in the shape of an annular rib for receiving the depression detecting device B, and a spring bearing 13D also in the shape of an annular rib surrounding the contact portion 13C.

As shown in FIGS. 1 and 2, the bottom wall 13B of the lower casing 13 includes a center electrode pattern 41 formed of a conductor and disposed in a central position surrounded by the contact portion 13C, and a ring electrode pattern 42 formed of a conductor and surrounding the center electrode pattern 41. The bottom wall 13B of the lower casing 13 has a depression detecting circuit formed by insert technique and connected to the center electrode pattern 41, and a depression detecting lead 43 connected to the depression detecting circuit and projecting downward. The ring electrode pattern 42 is connected to common fixed electrode patterns 51 through connecting patterns 59b and 59c. Specifically, the ring electrode pattern 42 is electrically connected through connecting patterns 59b and 59c to common fixed electrode pattern 51B and fixed electrode pattern 51C which are arranged in positions nearly 180° apart.

The common fixed electrode patterns 51 are connected to a common lead 54 through a circuit formed in the bottom wall 13B of the lower casing 13 by insert technique. A first fixed electrode pattern 52A is connected to a first count lead 55 through a circuit formed by insert technique. Similarly, a second fixed electrode pattern 52B is connected to a second count lead 44 through a circuit formed by insert technique. These common lead 54, first count lead 55 and second count lead 44 are formed to project downward. The lower casing 13 includes, formed in lower positions on the outer surface thereof, lead holders 13H having bores for receiving the four tilt detecting leads 33 and one common lead 34.

Further, the common fixed electrode patterns 51 have two or more contacted portions 60 arranged on the same circumference as a rotation locus T of a plurality of contacting portions 57A of a movable electrode 57. These contacted portions 60 are separated by two or more contacted portions 60 of the first fixed electrode pattern 52A and two or more contacted portions 60 of the second fixed electrode pattern 52B. That is, the group of common fixed electrode patterns 51A and 51B and the group of common fixed electrode patterns 51C and 51D are formed nearly 180° apart from each other. The ring electrode pattern 42 is insert molded along with the common fixed electrode patterns 51 in the bottom wall 13B after being positionally adjusted by using the common fixed electrode pattern 51B and common fixed electrode pattern 51C as two reference positions. Thus, the ring electrode pattern 42 and common fixed electrode patterns 51 are positioned with high accuracy.

The rotation detecting device C includes a rotor 56 which receives torque from a plurality of engaging pieces 24 formed in the form of a gear on the operating rod 20, a movable electrode 57 formed on the lower surface of the rotor 56 as shown in FIGS. 3 and 4, and a click spring 58 formed on the lower surface of the rotor 56. Conductive members 62 are formed partially on surfaces of the rotor 56 opposed to the movable electrode 57 and click spring 58. The movable electrode 57 and click spring 58 are electrically connected to each other through the conductive members 62.

This rotor 56 is formed of an insulating resin material with dies to define a cylindrical portion 56A centrally thereof, and a flange portion 56B formed at the lower end of the cylindrical portion 56A. The cylindrical portion 56A is formed such that the engaging pieces 24 fit into the upper end thereof.

The flange portion 56B of the rotor 56 has a rib projecting downward from the lower surface thereof. The distance between the lower end of the rib and the upper surface of the flange portion 56B is set to a value slightly smaller than a vertical dimension of a space formed in the lower casing 13. Therefore, in an assembled state of the combined control switch, the upper surface of the flange portion 56B of the rotor 56 lightly contacts the lower surface of the intermediate wall 12B of the upper casing 12. This realizes rotation of the rotor 56 with increased stability.

The movable electrode 57 is formed of a conductor such as a copper alloy to have a ring shape with a rotation center, and includes a plurality of contacting portions 57A formed in positions of the same radius from the rotation center. That is, the movable electrode 57 has a construction defining contacting portions 57A capable of sliding contact with a fixed electrode 50 in certain positions in the circumferential direction. In this embodiment, the contacting portions 57A are formed in a total of four positions at circumferential intervals of 90°.

Figure 5:
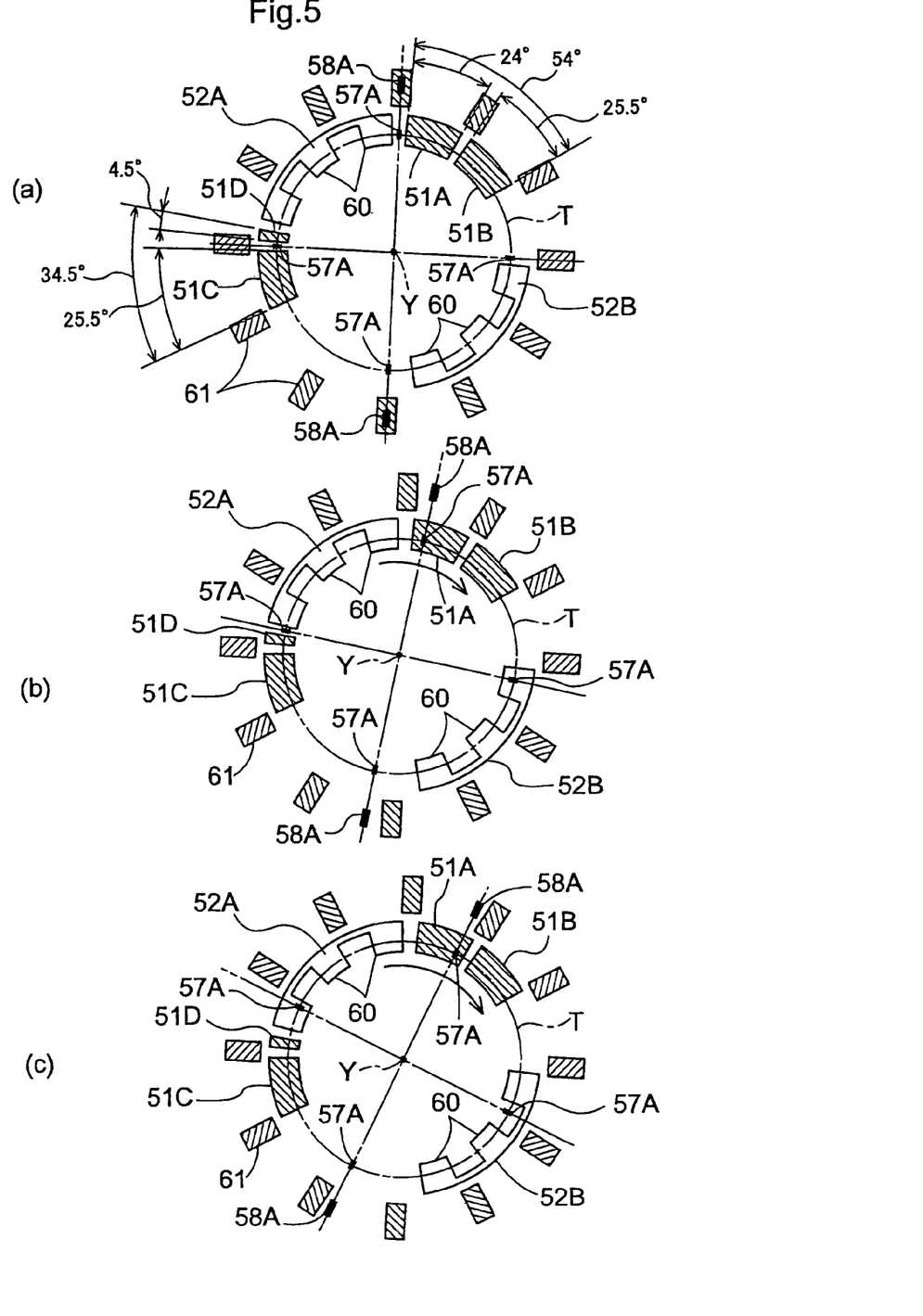
FIG. 5 is a view showing an arrangement of contacted portions of the fixed electrode and a positional relationship of the movable electrode.
Figure 6:
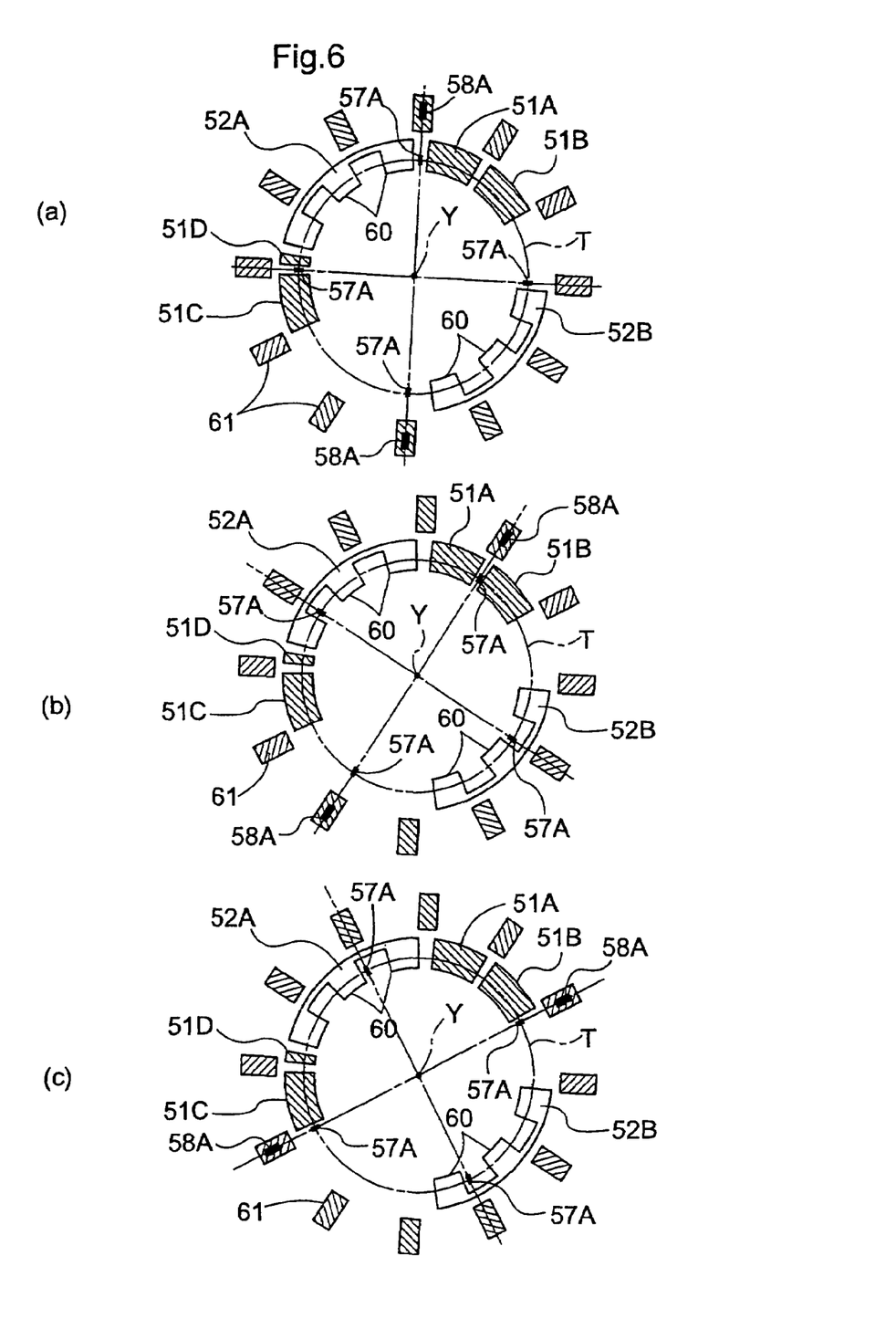
FIG. 6 is a view showing the arrangement of the contacted portions of the fixed electrode and the positional relationship of the movable electrode.

FIGS. 5 and 6 are views showing a positional relationship between the contacted portions 60 of the fixed electrode 50 and the contacting portions 57A of the movable electrode 57. Referring to FIGS. 2, 5 and 6, the fixed electrode 50 is disposed face to face with the movable electrode 57, and has the plurality of contacted portions 60 arranged in the form of stepping stones on the same circumference as a rotation locus T of the plurality of contacting portions 57A of the movable electrode 57. The fixed electrode 50 includes the first fixed electrode pattern 52A having two or more of the plurality of contacted portions 60, the second fixed electrode pattern 52B having two or more of the plurality of contacted portions 60, and the common fixed electrode patterns 51 having two or more of the plurality of contacted portions 60. Each of the fixed electrode patterns 51, 52A and 52B are not electrically connected to the others. The two or more (three in this embodiment) contacted portions 60 of the first fixed electrode pattern 52A are arranged continually on the circumference, and the two or more (three in this embodiment) contacted portions 60 of the second fixed electrode pattern 52B are arranged continually on the circumference. Alternatively, each of the first fixed electrode pattern 52A and second fixed electrode pattern 52B may be constructed by using one contacted portion 60.

As described above, the contacted portions 60 forming the first fixed electrode pattern 52A, second fixed electrode pattern 52B and common fixed electrode patterns 51 are arranged on the same circumference. This arrangement can reduce the diameter compared with the case where the contacted portions 60 are arranged on different circumferences.

Further, as illustrated in FIG. 5 (a), the common fixed electrode pattern 51A is installed on the circumference in an angular range of 24°, the common fixed electrode pattern 51B is installed in an angular range of 25.50, the common fixed electrode pattern 51C is installed in an angular range of 25.5°, and the common fixed electrode pattern 51D is installed in an angular range of 4.5°. Therefore, the sum total of the angular ranges in which the common fixed electrode patterns 51A, 51B, 51C and 51D are installed on the circumference is 79.5°. The sum total of the angular ranges of the common fixed electrode patterns 51A, 51B, 51C and 51D including the gaps between the common fixed electrode patterns is 88.50. These angles are smaller than a gap between the contacting portions 57A of the movable electrode 57 which is 90° (=360°/4). That is, in this embodiment, the sum total of the angular ranges in which the common fixed electrode patterns 51A, 51B, 51C and 51D are installed is set smaller than a gap (90°) between the contacting portions 57A.

During rotation of the rotor 56, as shown in FIGS. 5 (b) and 5 (c), the contacting portions 57A of the movable electrode 57, when contacting at least one of the first fixed electrode pattern 52A and second fixed electrode pattern 52B, contact also the common fixed electrode patterns 51. Therefore, the first fixed electrode pattern 52A and second fixed electrode pattern 52B and common fixed electrode patterns 51 reach a conduction state, respectively.

In addition, the rotary type pulse switch in this embodiment has the plurality of contacted portions 60 arranged in such a positional relationship that a full insulation state occurs in the course of rotation of the movable electrode 57 in which none of the contacting portions 57A contact the first fixed electrode pattern 52A, second fixed electrode pattern 52B or common fixed electrode patterns 51.

As shown in FIGS. 2, 5 (a) and 6 (a) through 6 (c), for example, none of the contacting portion 57A of the movable electrode 57 are in contact with the first fixed electrode pattern 52A, second fixed electrode pattern 52B or common fixed electrode patterns 51. In this embodiment, as seen from FIGS. 6 (a) through 6 (c), the full insulation state occurs 12 times while the movable electrode 57 makes one rotation.

As described above, the contacting portions 57A of the movable electrode 57 and the contacted portions 60 of the fixed electrode 50 are arranged in such a positional relationship that the full insulation state occurs where the movable electrode 57 and fixed electrode 50 are not electrically connected to each other. In the full insulation state, the movable electrode 57 never picks up static electricity. As a result, the frequency of static electricity entering varied electrical components electrically connected to the movable electrode 57 and fixed electrode 50 becomes low, thereby to reduce the possibility of the electrical components being damaged by electrostatic discharge.

The bottom wall 13B of the lower casing 13 has a plurality of corrugations 53 for clicking formed in positions surrounding the fixed electrode 50. The click spring 58 electrically connected to the movable electrode 57 is in the shape of a ring formed of an elastically deformable metal material, and includes two downward projections 58A arranged circumferentially thereof. In this embodiment, the projections 58A are formed on the same diametric line on which two contacting portions 57A are formed. At the time of rotation of the operating rod 20 (i.e. at the time of rotation of the rotor 56), a feeling of clicking is produced by the projections 58A engaging with and disengaging from the corrugations 53 consisting of grooves 53a and ridges 53b formed on the bottom wall 13B of the lower casing 13. In this embodiment, in particular, the projections 58A are arranged to fit into the grooves 53a in times of the full insulation state which occurs 12 times while the movable electrode 57 makes one rotation as noted hereinbefore.

Further, in this embodiment, grounding electrodes 61 are formed in the grooves 53a into which the projections 58A fit, to act as a grounding device for grounding the movable electrode 57 in times of the above full insulation state. The grounding electrodes 61 are individually grounded through a circuit formed by insert technique in the bottom wall 13B of the lower casing 13.

Thus, with the grounding electrodes 61 provided for grounding the movable electrode 57 and click spring 58 in times of the full insulation state, even if the movable electrode 57 and click spring 58 are charged with static electricity, the static electricity can be released to the grounding electrodes 61 in times of the full insulation state.

The depression detecting device B includes a dome-shaped spring plate 45 disposed in a position for covering the center electrode pattern 41 and ring electrode pattern 42 formed on the bottom wall 13B of the lower casing 13, a first contact member 46 disposed above the spring plate 45, and a second contact member 47 fitted and connected to the first contact member 46. Further, the depression detecting device B includes a compression coil type return spring 48 mounted between the spring bearing 13D and a spring bearing member 26 of the operating rod 20.

The spring plate 45 is formed of a conductive disk-like material such as a copper alloy or ferroalloy, and is dome-shaped to have a central portion thereof bulging upward. In the absence of a pressing force acting thereon, the spring plate 45 has the periphery thereof in contact with the ring electrode pattern 42, and the central portion separated from the center electrode pattern 41.

When a pressing force is applied to the spring plate 45 from above, the spring plate 45 is elastically deformed to move the central portion thereof into contact with the center electrode pattern 41, whereby the center electrode pattern 41 and ring electrode pattern 42 reach the conduction state. While the illustrated construction has the single spring plate 45, a plurality of spring plates 45 may be stacked for use.

The lower, first contact member 46 is formed of a relatively soft insulating resin material such as silicone rubber. The upper, second contact member 47 is formed of an insulating, relatively hard resin material. The first contact member 46 and second contact member 47 are fitted and connected to each other. The lower, first contact member 46 is vertically operable as guided by the inner surface of the contact portion 13C. The upper surface of the upper, second contact member 47 includes a concave portion corresponding to the shape of a contact portion 25 at the lower end of the operating rod 20. Thus, even when the operating rod 20 somewhat inclined, the second contact member 47 can transmits a pressure from the contact portion 25 to the spring plate 45 through the first contact member 46.

The rib-like contact portion 13C projects from the bottom wall 13B of the lower casing 13 by an amount set such that, when the operating rod 20 is depressed, the contact portion 13C contacts the spring bearing member 26 after the pressing force from the operating rod 20 places the detecting device B in a detecting state.

A mechanism for detecting depression of the operating rod 20 will be described hereinafter.

When the operating rod 20 is depressed in a state of applying the voltage of either one of the depression detecting lead 43 and common lead 54, the operating rod 20 moves along the rod axis Y. With this movement, the operating rod 20 applies a pressing force through the first contact member 46 and second contact member 47 to the spring plate 45. As a result, the spring plate 45 elastically deforms to place the center electrode pattern 41 and ring electrode pattern 42 in the conduction state. This depressing operation can be taken out as a voltage signal of the depression detecting lead 43.

When the operating rod 20 is depressed as described above, the spring plate 45 elastically deforms to produce a feeling of clicking, which enables the operator to recognize that the depression has been detected. Further, when the operating rod 20 is depressed, the spring bearing member 26 of the operating rod 20 contacts the rib-like contact portion 13C immediately after the spring plate 45 elastically deforms, placing the center electrode pattern 41 and ring electrode pattern 42 in the conduction state. Moreover, since the first contact member 46 is flexibly and elastically deformable, even when the operating rod 20 is depressed by a strong force, it is possible to avoid an inconvenience of applying an excessive force to and damaging the center electrode pattern 41 and ring electrode pattern 42 or the spring plate 45.

Although it is ideal that the operating rod 20 is in neutral N when depressed, the operating rod 20 can be depressed also when slightly inclined. Especially when the operating rod 20 depressed in a greatly inclined state, the part of the spring bearing member 26 at the lower end of the operating rod 20 that projects to the largest extend downward because of the inclination will contact the contact portion 13C. This produces a force for erecting the operating rod 20 toward neutral N. This realizes depression of the operating rod 20 brought close to the neutral N.

A mechanism for detecting rotation of the operating rod 20 will be described hereinafter.

Consider the case where the operating rod 20 is rotated in a state of applying voltage to either the common fixed electrode patterns 51 or the first fixed electrode pattern 52A and second fixed electrode pattern 52B. In this case, with the rotation of the rotor 56, the movable electrode 57 and first fixed electrode pattern 52A attain the conduction state when a contacting portion 57A at the outer periphery of the movable electrode 57 contacts the first fixed electrode pattern 52A. The movable electrode 57 and first fixed electrode pattern 52A becomes the insulation state when this contacting portion 57A separates from the first fixed electrode pattern 52A. As a result, the voltage of the first count lead 55 is changed to the opposite direction.

Similarly, with rotation of the rotor 56, the movable electrode 57 and second fixed electrode pattern 52B attain the conduction state when a contacting portion 57A at the outer periphery of the movable electrode 57 contacts the second fixed electrode pattern 52B. The movable electrode 57 and second fixed electrode pattern 52B becomes the insulation state when this contacting portion 57A separates from the second fixed electrode pattern 52B. As a result, the voltage of the second count lead 44 is changed to the opposite direction.

In this embodiment, the switch is designed such that timing of the movable electrode 57 and first fixed electrode pattern 52A becoming the conduction state and insulation state is different from timing of the movable electrode 57 and second fixed electrode pattern 52B becoming the conduction state and insulation state. Times of changing of the voltages of the first count lead 55 and second count lead 44 may be counted in a substrate outside this combined control switch, thereby deriving rotation information such as an amount of rotation and a direction of rotation of the operating rod 20 (to function as an incremental rotary encoder).

Second Embodiment

The rotary type pulse switch of the second embodiment is the same as the rotary type pulse switch of the first embodiment in the construction of the fixed electrode, but is different in the other mechanisms from the rotary type pulse switch of the first embodiment. The rotary type pulse switch of the second embodiment will be described hereinafter, omitting description of the same construction as in the first embodiment.

Figure 7:
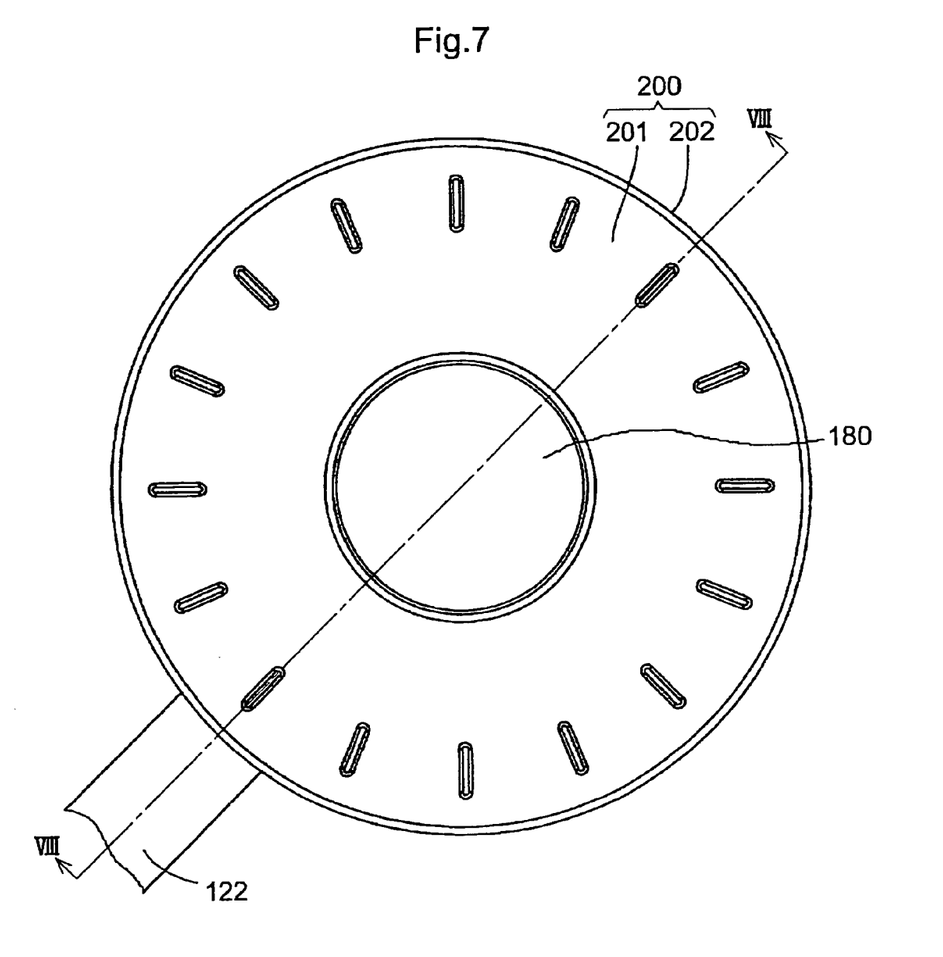
FIG. 7 is a top view of a rotary type pulse switch of a second embodiment.
Figure 8:
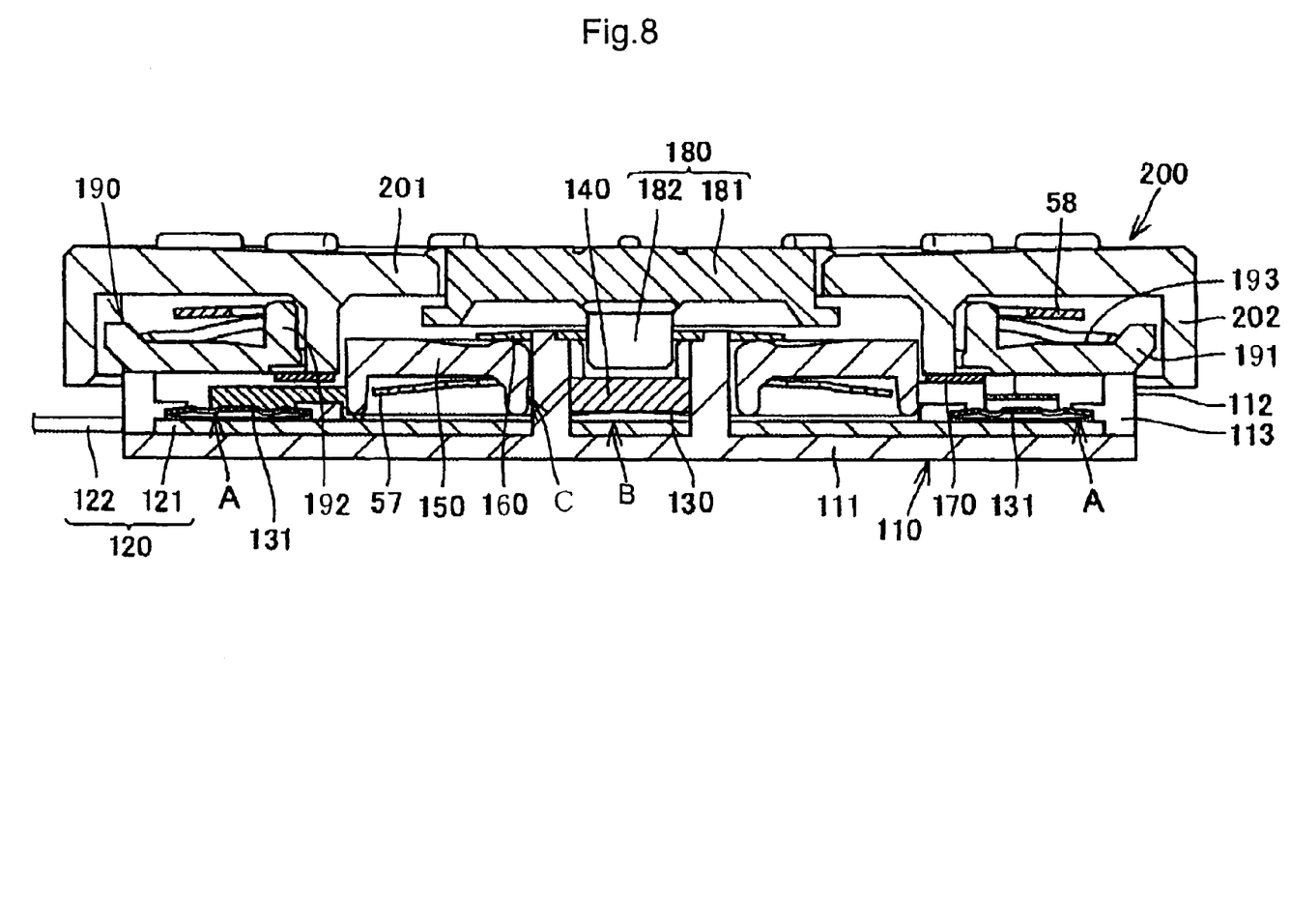
FIG. 8 is a view in vertical section of the rotary type pulse switch of the second embodiment.
Figure 9:
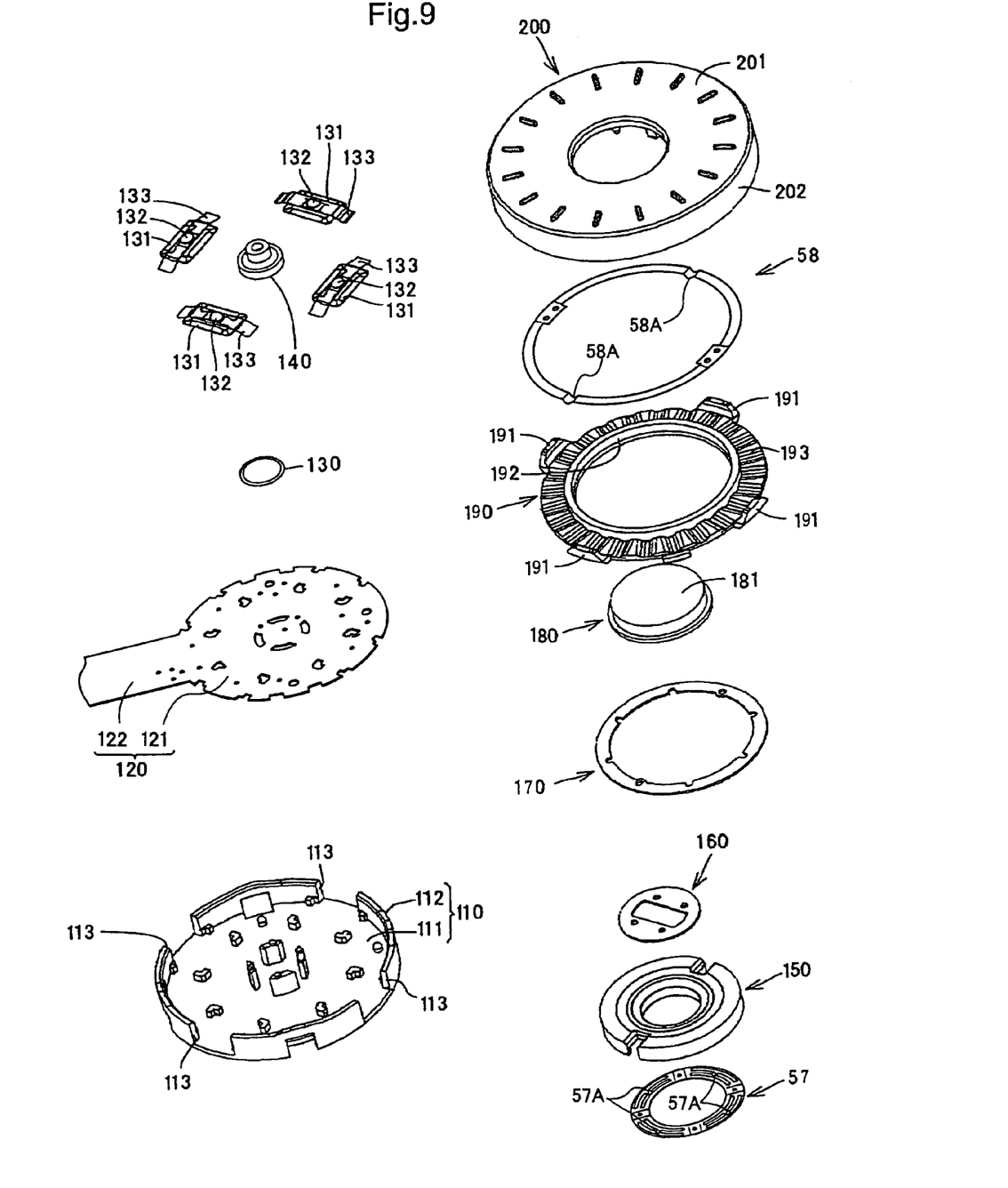
FIG. 9 is an exploded perspective view of the rotary type pulse switch of the second embodiment.
Figure 10:
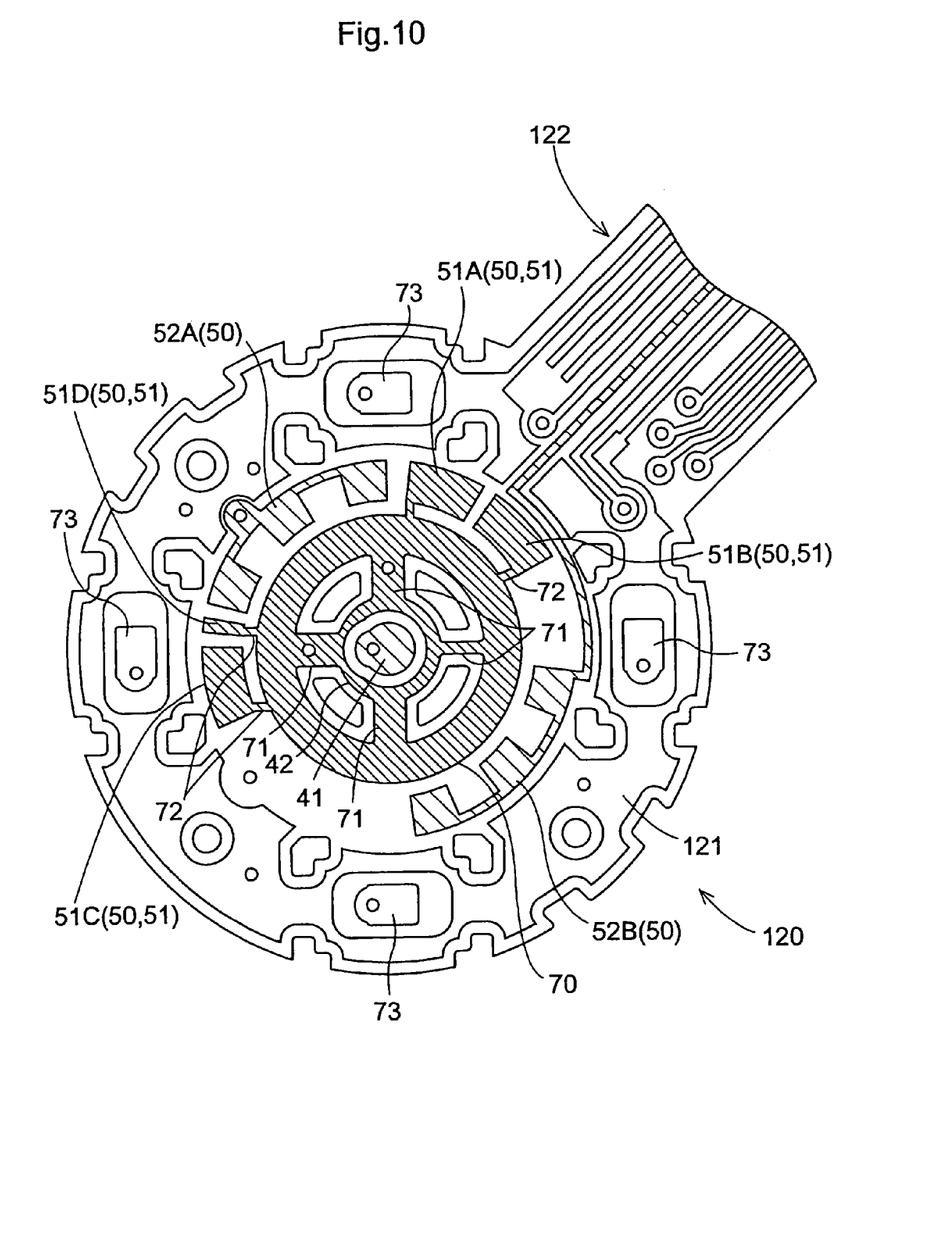
FIG. 10 is a top view of a flexible substrate.

FIG. 7 is a top view of the rotary type pulse switch of the second embodiment. FIG. 8 is a view in vertical section of the rotary type pulse switch. FIG. 9 is an exploded perspective view of the rotary type pulse switch. FIG. 10 is a top view of a flexible substrate. As seen, the rotary type pulse switch of the second embodiment includes a first operating object 180 vertically movable relative to a case 110 to accept pushing operation. The first operating object 180 has a disk-like operating portion 181, and a depressing portion 182 formed on the lower surface of the operating portion 181.

The first operating object 180 is surrounded by a second operating object 200 capable of accepting tilting operation and rotating operation. Thus, as in the first embodiment, the rotary type pulse switch of the second embodiment is included in combined control switches having a tilt detecting device A for electrically detecting tilting of the second operating object 200, a depression detecting device B for electrically detecting depression of the first operating object 180, and a rotation detecting device C for electrically detecting rotation of the second operating object 200.

The case 110 includes a flexible substrate 120 disposed on a bottom plate 111 thereof. The flexible substrate 120 has, formed thereon, fixed electrodes 50 (first fixed electrode pattern 52A, second fixed electrode pattern 52B and common fixed electrode patterns 51) as described in the first embodiment, for use in detecting rotation of the second operating object 200. The flexible substrate 120 has a substantially circular body portion 121, and an external connection portion 122 of rectangular shape provided for the body portion 121. The flexible substrate 120 has also a center electrode pattern 41 and a ring electrode pattern 42 used for detecting depression of the first operating object 180. These electrode patterns are arranged as described in the first embodiment with reference to FIGS. 2, 5 and 6.

As shown in FIG. 10, the center electrode pattern 41 formed of a conductor is disposed in a central position surrounded by the first fixed electrode pattern 52A, second fixed electrode pattern 52B and common fixed electrode patterns 51 on the flexible substrate 120. The ring electrode pattern 42 is disposed around the center electrode pattern 41. An annular electrode pattern 70 is formed around the ring electrode pattern 42. The ring electrode pattern 42 and annular electrode pattern 70 are connected by connecting patterns 71. Similarly, the common fixed electrode patterns 51 and annular electrode pattern 70 are connected by connecting patterns 72. Thus, the common fixed electrode patterns 51, annular electrode pattern 70 and ring electrode pattern 42 are at the same potential.

The first fixed electrode pattern 52A, second fixed electrode pattern 52B and common fixed electrode patterns 51 formed on the flexible substrate 120 are used by rotation detecting device C. The center electrode pattern 41 and ring electrode pattern 42 formed on the flexible substrate 120 are used by the depression detecting device B. Further, the flexible substrate 120 has four fixed contacting portions 73 formed in peripheral regions thereof and arranged at intervals of 90° to be used by the tilt detecting device A.

A spring member 130 is disposed above the flexible substrate 120 to be opposed to the center electrode pattern 41 and ring electrode pattern 42. A resilient element 140 is mounted on the spring member 130. Four snap plates 131 are arranged above the flexible substrate 120 to be opposed to the four fixed contacting portions 73, respectively. Each snap plate 131 has a combination of a poron 132 disposed on top, and a tape 133 for attaching to the flexible substrate 120 the snap plate 131 with the poron 132 placed on top.

Further, the movable electrode 57 is disposed above the flexible substrate 120 to be opposed to the first fixed electrode pattern 52A, second fixed electrode pattern 52B and common fixed electrode patterns 51.

Above the movable electrode 57 are a rotor 150 rotatable with the second operating object 200 and having the movable electrode 57 attached thereto, and a stator 160 for fixing the rotor 150 to the case 110.

The second operating object 200 is an annular member placed over the case 110, and includes an annular top board portion 201, an outer wall portion 202 erected on the periphery portion of the lower surface of the top board portion 201, and a clamping plate 170 attached to the inner side of the outer wall portion 202 of the lower surface of the top board portion 201

An annular keytop 190 is disposed on the lower surface of the second operating object 200 to be tiltable with tilting of the second operating object 200.

The keytop 190 is an annular plate-like object fitted in a space between the outer wall portion 112 of the case 110 and an inner wall portion of the second operating object 200. The keytop 190 has four projections 191 formed on the peripheral surface thereof at intervals of 90°, an annular ridge 192 erected on an inner edge of the upper surface, and corrugations 193 for clicking formed in areas of the upper surface excluding the ridge 192.

Further, a click spring 58 is formed between the second operating object 200 and keytop 190.

When the first operating object 180 is depressed, the spring member 130 of the depression detecting device B is depressed through the resilient element 140. This inverts the spring member 130 into contact with the center electrode pattern 41. As a result, the depression detecting device B is turned on to output a signal which is inputted to an electronic device, not shown, through the external connection portion 122 of the flexible substrate 120.

When the first operating object 180 is subsequently freed from the depressing force, the first operating object 180 is pushed up by the restoring force of the spring member 130 and resilient element 140.

When the second operating object 200 is tilted, the operated part of the top board portion 201 of the second operating object 200 depresses the corresponding projection 191 and part of the ridge 192 of the keytop 190. On the other hand, the part remote from where the tilting force is applied of the outer edge of the clamping plate 170 connected to the second operating object 200 pushes up the corresponding part of the inner edge of the keytop 190. Consequently, the second operating object 200 and keytop 190 are tilted. At this time, the projection 191 of the keytop 190 in the tilting movement is guided by a cutout 113 of the outer wall portion 112 of the case 110.

The keytop 190 depresses a snap plate 131 of the tilt detecting device A. Then, the snap plate 131 is inverted into contact with a corresponding one of the fixed contacting portions 73. As a result, the tilt detecting device A is turned on to output a signal which is inputted to the electronic device, not shown, through the external connection portion 122 of the flexible substrate 120.

When the second operating object 200 is subsequently released, the keytop 190 and second operating object 200 are pushed up by the restoring force of the snap plate 131 to return to a horizontal state.

When the second operating object 200 is rotated, the rotor 150 fitted to the second operating object 200 also is rotated. As a result, as in the first embodiment, the contacting portions 57A of the movable electrode 57 attached to the rotor 150 slide over the fixed electrode 50 (first fixed electrode pattern 52A, second fixed electrode pattern 52B and common fixed electrode patterns 51). In this embodiment also, the switch is designed such that timing of the movable electrode 57 and first fixed electrode pattern 52A becoming the conduction state and insulation state is different from timing of the movable electrode 57 and second fixed electrode pattern 52B becoming the conduction state and insulation state. Signals indicating a direction of rotation and a rotation angle, which are obtained as in the first embodiment, are inputted to the electronic device, not shown, through the external connection portion 122 of the flexible substrate 120.

In time of rotation of the second operating object 200, a feeling of clicking is produced by the projections 58A engaging with and disengaging from the corrugations 193 as in the first embodiment.

Other Embodiments

In the above embodiments, specific numerical examples are given to the angular ranges in which the first fixed electrode pattern 52A, second fixed electrode pattern 52B and common fixed electrode patterns 51 are installed, and the intervals (90°) betweens the contacting portions 57A of the movable electrode 57. Such numerical values may be varied as appropriate.

In the above embodiments, the common fixed electrode patterns 51A, 51B and 51C may be moved to 180° opposite positions on the rotation locus T.

What is claimed is:

1. A rotary type pulse switch comprising:
    a movable electrode with a rotation center and having a plurality of contacting portions formed in positions of the same radius from the rotation center; and
    a fixed electrode disposed face to face with the movable electrode and having a plurality of contacted portions arranged in form of stepping stones on the same circumference as a rotation locus of the contacting portions;
    wherein said fixed electrode includes a first fixed electrode pattern having at least two of said contacted portions being arranged continually on said circumference, a second fixed electrode pattern having at least two of said contacted portions being arranged continually on said circumference, and a common fixed electrode pattern having at least two of said contacted portions, each of the fixed electrode patterns being in a mutually nonconductive state;
    said contacted portions are arranged in such a positional relationship that a full insulation state occurs during rotation of said movable electrode in which none of said contacting portions contact said first fixed electrode pattern, said second fixed electrode pattern or said common fixed electrode pattern; and
    said at least two contacted portions of said common fixed electrode pattern are arranged on said circumference as separated by said at least two contacted portions of said first fixed electrode pattern and said at least two contacted portions of said second fixed electrode pattern;
    rotation information of said movable electrode being detected based on conduction states of said contacting portions and said contacted portions when said movable electrode is rotated.

2. A rotary type pulse switch as defined in claim 1, further comprising grounding means for grounding said movable electrode in times of said full insulation state.

* * * * *